United States Patent [19]

Zillner, Jr.

[11] Patent Number: 4,974,665

[45] Date of Patent: Dec. 4, 1990

[54] HUMIDITY CONTROL SYSTEM

[76] Inventor: Anthony H. Zillner, Jr., 438 Lotus La., Glenview, Ill. 60025

[21] Appl. No.: 377,493

[22] Filed: Jul. 10, 1989

[51] Int. Cl.$^5$ ............................ F24F 3/14; F25B 29/00
[52] U.S. Cl. ...................................... 165/21; 165/24; 165/26; 165/20; 236/51; 236/44 C
[58] Field of Search ................... 165/3, 24, 25, 26, 21, 165/20; 236/51, 44 C

[56] References Cited

U.S. PATENT DOCUMENTS

| | | | |
|---|---|---|---|
| 2,110,025 | 3/1938 | Ridge | 165/25 |
| 2,133,872 | 10/1938 | Roessler | 165/25 |
| 3,305,173 | 2/1967 | Beckman | 236/11 |
| 3,815,668 | 6/1974 | Carlson | 236/1 ER |
| 3,945,564 | 3/1976 | Smallegan | 236/46 E |
| 4,083,397 | 4/1978 | Kimpel et al. | 165/26 |
| 4,186,873 | 2/1980 | Geisler et al. | 236/44 A |
| 4,290,480 | 9/1981 | Sulkowski | 165/21 |
| 4,819,716 | 4/1989 | Beachboard | 165/21 |
| 4,889,179 | 12/1989 | Merenda | 236/51 |

FOREIGN PATENT DOCUMENTS 0125248  6/1987  Japan ..................................... 165/21

*Primary Examiner*—John Ford

*Attorney, Agent, or Firm*—Mason, Kolehmainen, Rathburn & Wyss

[57] ABSTRACT

A system for HVAC and humidification includes a control signal source which supplies two distinct control signals over two wires of a four wire link. The control signals are supplied to a temperature control signal source and for a fan/humidity control signal source. The temperature control signal source generates a temperature control signal and transmits the temperature control signal to a temperature signal decoder by means of a third wire of the four wire link. The temperature signal decoder decodes the temperature control signal and turns on either a furnace or an air-conditioner. The furnace and the air-conditioner each have a connection to a fan so that the furnace and the air-conditioner can each signal the fan to blow the heated or cooled air into the living area. The fan/humidity control source operates independently of the temperature control signal source and generates a fan/humidity control signal for transmission over a fourth wire of the four wire link. The fan/humidity control signal is received over the fourth wire of the four wire link by a fan/humidity signal decoder. The signal decoder decodes the fan/humidity control signal and turns on either the fan or a humidifier. The humidifier has a connection to the fan enabling the humidifier to control the fan and blow humidified air into the living area.

8 Claims, 1 Drawing Sheet

HUMIDITY CONTROL SYSTEM

BACKGROUND OF THE INVENTION

1. Field of the Invention

This invention relates generally to environmental control systems such as heating, ventilating, humidifying and air-conditioning systems, and more particularly to an environmental control system providing independent operation, and convenient control of the humidifier using existing wiring.

2. Description of the Prior Art

Humidification of the living space in the household is desirable because static shocks and the drying of respiratory tracks occurs if the humidity level is low. However, humidification does not always occur at the most desirable times with known systems.

Conventional household heating, ventilating and air-conditioning (HVAC) systems such as are shown in U.S. Pat. Nos. 2,544,544, 3,587,558 and 3,877,459 operate using forced air and include a humidifier slaved to the system's blower fan. The blower is dependent upon the operation of the furnace component or the air-conditioning component of the system, and humidification only occurs when the household temperature is being adjusted. Furthermore, when the outside air temperature and the thermostat setting for the inside air temperature in the HVAC system are approximately the same, the furnace, and consequently the humidifier, will rarely activate and a condition of low humidity cannot be corrected.

Further disadvantages result from slaving the humidifier to the system blower. Moisture in a living space retains heat and tends to maintain the temperature in the living space. If the humidifier only operates when the furnace adjusts the air temperature of the living space, the humidity in the living space is less than optimum and consequently the retention of heat in the living space is also less than optimum. Additionally, a humidifier can add moisture to a living space which is dry and hot so that the moisture absorbs heat and thereby reduce air temperature while providing moisture to the air.

Accordingly, there are strong advantages to an environmental control system having a humidifier which operates independently of the heating and cooling elements.

U.S. Pat. Nos. 3,305,173 and 4,186,873 disclose prior art solutions to the problem of providing independent humidifier control. U.S. Pat. No. 3,305,173 discloses a six wire system for controlling a blower and a furnace from a living area. However, existing HVAC systems are traditionally controlled by four wires extending from the environmentally controlled living area to the plant area where the humidifier, furnace and air-conditioner are usually located. The application of the system shown in U.S. Pat. No. 3,305,173 to an existing environmental control system requires the rewiring of the household to include at least two more connecting wires to provide independent humidifier control, and even more additional wires if an air-conditioner is included in the system.

U.S. Pat. No. 4,186,873 avoids the rewiring the household by adding a household carrier current transmitter to the living space and a household carrier current receiver to the plant area. However, carrier current control can significantly raise the cost of a household environmental control system as well as interfere with existing household carrier current security systems or the like.

OBJECTS AND SUMMARY INVENTION

It is an object of the present invention to solve the problems of the prior art environmental control systems.

It is another object of the invention to provide an environmental control system with an independently operated humidifier.

It is a further object of the invention to provide an independently operated humidifier in an environmental control system which uses existing wiring and components.

It is yet another object of the present invention to provide an environmental control system where the humidistat is conveniently located in the living area with the other system controls without the necessity of rewiring the building structure.

The present invention provides a heating, ventilating, air-conditioning and humidifying system comprising a control signal source which supplies two distinct control signals over two wires of a four wire link. The control signals are supplied to a temperature control signal source and to a fan/humidity control signal source. The temperature control signal source generates a temperature control signal and transmits the temperature control signal to a temperature signal decoder by means of a third wire of the four wire link. The temperature signal decoder decodes the temperature control signal and turns on either a heat generating device such as a furnace or a cold generating device such as an air-conditioner. The furnace and the air-conditioner each have a connection to an air circulation device such as a fan so that the furnace and the air-conditioner can each signal the fan to blow heated or cooled air into the living area. The fan/humidity control source operates independently of the temperature control signal source and generates a fan/humidity control signal for transmission over a fourth wire of the four wire link. The fan/humidity control signal is received over the fourth wire of the four wire link by a fan/humidity signal decoder. The signal decoder decodes the fan/humidity control signal and turns on either the fan or a humidifier. The humidifier has a connection to the fan enabling the humidifier to control the fan and blow humidified air into the living area.

BRIEF DESCRIPTION OF THE DRAWING

These and other objects and advantages of the present invention will become readily apparent upon consideration of the following detailed description and attached drawing, wherein.

DETAILED DESCRIPTION OF THE INVENTION

The present invention provides independent humidifier operation in an environmental control system using the existing wiring of a building structure.

Figure 3:
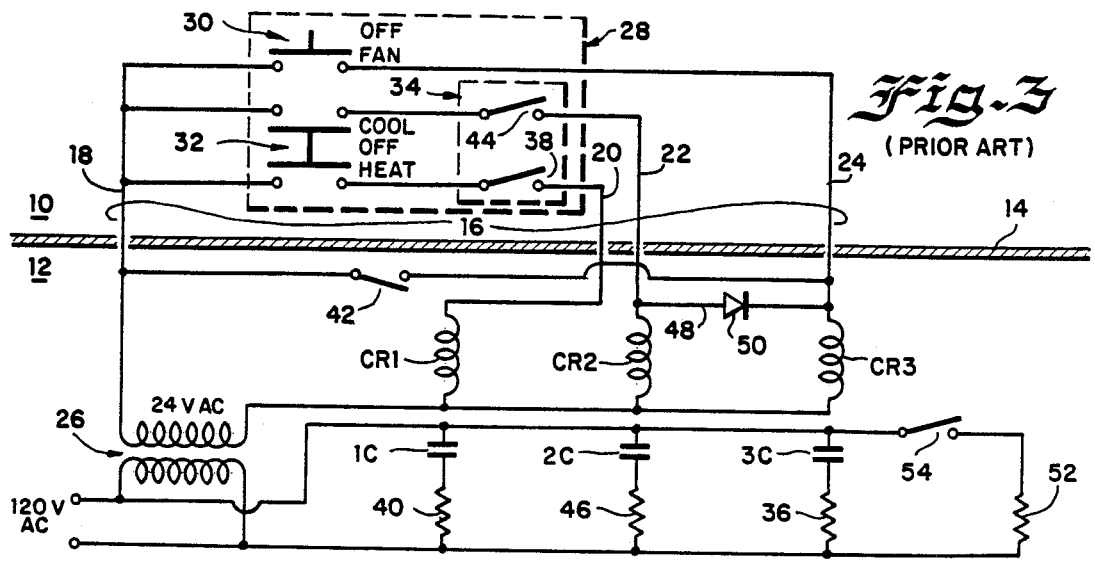
FIG. 3 is a wiring diagram of a prior art HVAC and humidity control system.

FIG. 3 shows a wiring diagram for a prior art environmental control system where the living area 10 and a plant area 12 such as a basement are connected through a floor 14 or other barrier by a link 16 including four wires 18, 20, 22 and 24. A first of these wires 18 provides a power signal from a power source such as a transformer 26 to a control unit 28 in the living area 10.

The control unit 28 includes an ON/OFF fan control switch 30, a three position temperature selection switch 32 having HEAT/COOL/OFF contacts, and a thermostat 34. The control unit 28 functions to distribute power from the power supply to elements of an HVAC system as determined by the switch settings. When the fan control switch 30 is in the ON position, a control signal is transmitted by means of the wire 24 of the link 16 through the floor 14 to energize a fan relay CR3. The fan relay CR3 in turn closes fan contacts 3C to energize a fan 36. The fan 36 can be operated to circulate ambient air without heating, cooling or humidification.

When the temperature selection switch 32 is in the HEAT position and thermostat contacts 38 of the thermostat 34 are in the closed position signaling a demand for heat, a control signal is transmitted by means of the wire 20 of the link 16 through floor 14 to energize a heat relay CR1. The heat relay CR1 in turn closes heater contacts 1C to energize a heater 40 such as a furnace. A heat responsive fan switch 42 such as a thermocouple is mounted on the furnace 40 and monitors the temperature in the furnace 40 until a minimum heating temperature is reached. When the minimum temperature is reached, the switch 42 closes to provide an energizing signal to fan 36 by means of fan relay CR3. The fan then blows the heated air from the furnace 40 into the living area 10 by means of ventilating ducts (not shown).

When the temperature selection switch 32 is in the COOL position and thermostat contacts 44 of the thermostat 34 are closed signaling a demand for cooling, a control signal is transmitted by means of the wire 22 of the link 16 through the floor 14 to energize a cooling relay CR2. The cooling relay CR2 in turn closes cooling contacts 2C to energize a cooling device such as an air-conditioner 46. A wiring connection 48 is provided between the wire 24 and the wire 22 so that the fan 36 is energized whenever the air-conditioner 46 is energized, and an appropriately poled rectifier 50 is provided to ensure that the air-conditioner 46 is not energized by a fan energizing control signal.

It is readily apparent that when a humidifier 52 is added to a prior art system such as this, the humidistat 54 must be inconveniently located in the plant area 12 unless at least one additional wire is run between the plant area 12 and the living area 10. In either case the humidifier 52 is only effective when the fan 36 is on to blow moisture laden air into the living area 10.

However, in the present invention the humidistat 54 is conveniently located in the living area 10 with the thermostat 34 and the temperature selection switch 32 without the necessity of rewiring. Additionally the humidifier 52 has independent control of the fan 36.

Figure 1:
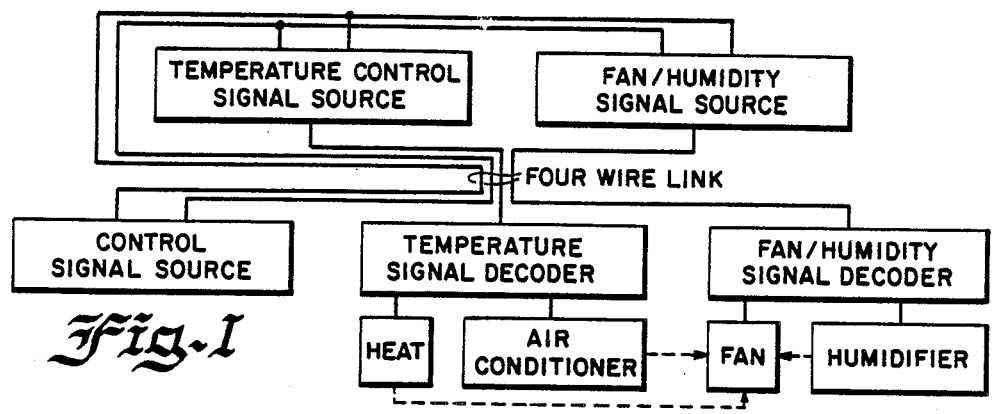
FIG. 1 is a block diagram of showing the HVAC and humidity control system of the present invention.

FIG. 1 shows a block diagram of the present invention including a control signal source which supplies two distinct and different control signals over two wires of a four wire link. The two control signals are each supplied to a temperature control signal source and to a fan/humidity control signal source. The temperature control signal source generates a temperature control signal and transmits the temperature control signal to a temperature signal decoder by means of a third wire of the four wire link. This temperature control signal represents either a demand for heat or for cooling. The temperature signal decoder decodes the temperature control signal and turns on either a heat generating device such as a furnace or a cold generating device such as an air-conditioner. The furnace and the air-conditioner each have a connection to an air circulation device such as a fan so that the furnace and the air-conditioner can each signal the fan to blow the heated or cooled air into the living area.

The fan/humidity control source operates independently of the temperature control signal source and generates a fan/humidity control signal for transmission over a fourth wire of the four wire link. This control signal represents either a command for fan operation or a demand for humidity. The fan/humidity control signal is received over the fourth wire of the four wire link by a fan/humidity signal decoder. The signal decoder decodes the fan/humidity control signal and turns on either the fan or a humidifier. The humidifier has a connection to the fan enabling the humidifier to control the fan and blow humidified air into the living area.

Figure 2:
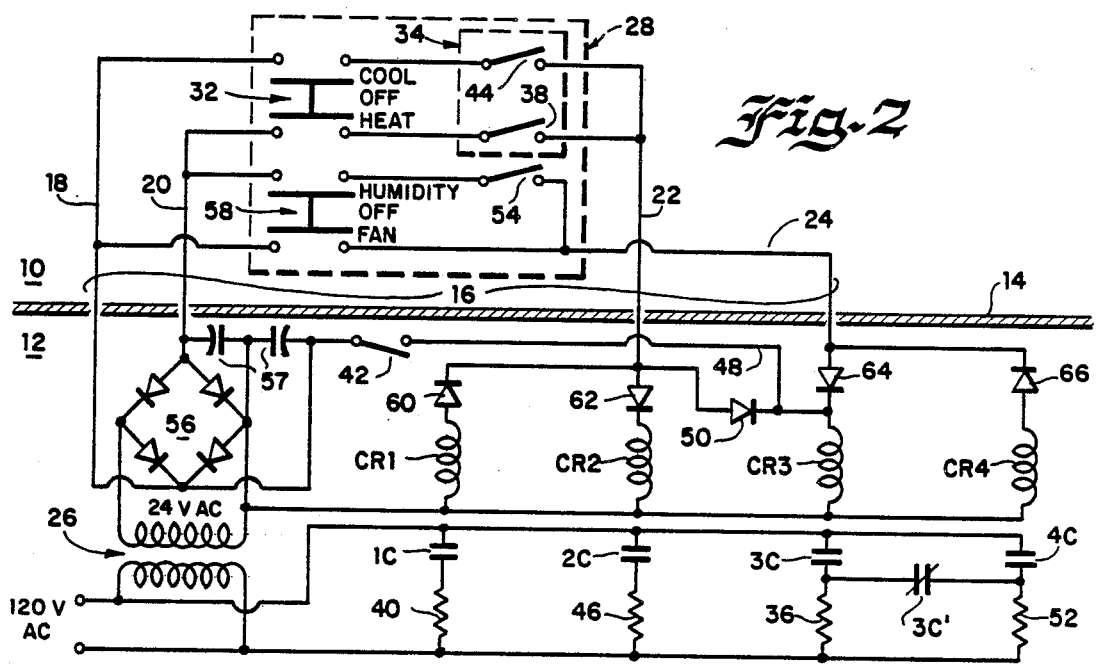
FIG. 2 is a wiring diagram of an embodiment of the HVAC and humidity control system shown in FIG. 1.

FIG. 2 shows a wiring diagram for the present invention as applied to the prior art system shown in FIG. 3 and previously discussed. In general, the same reference numerals are used if substantially the same component is used in the system of the present invention and the prior art system.

In FIG. 2, the control signal source includes the transformer 26, a rectifier bridge 56 for providing positive and negative rectified control signals, filter capacitors 57 and the wires 18 and 20 of the four wire link 16 between the living area 10 and the plant area 12. Each of the wires 18 and 20 transmit either a positive or a negative rectified signal from the rectifier bridge 56 to both the temperature control signal source and to the fan/humidity control signal source. The temperature control signal includes the temperature control switch 32, the thermostat 34 and the wire 22 of the four wire link 16. The fan/humidity control signal source includes a three position switch 58 having HUMIDITY, FAN and OFF positions, the humidistat 54 and the wire 24 of the four wire link 16.

In operation, the temperature control signal source transmits a negative, rectified temperature control signal over the wire 22 if the temperature control switch 32 is placed in COOL position and thermostat switch 44 is closed, and transmits a positive, rectified temperature control signal over the wire 22 if the temperature control switch 32 is in the HEAT position and thermostat switch 38 is closed. Similarly, the fan/humidity control source transmits a negative rectified fan/humidity control signal over the wire 24 if the switch 58 is placed in the FAN position, and transmits a positive rectified fan/humidity control signal over the wire 24 if the switch 58 is placed in the HUMIDITY position and humidistat switch 54 is closed. The polarities and the wire arrangements selected can be changed if the connections and the polarities are consistently maintained throughout the system of the present invention.

The temperature signal decoder, including the wire 22 of the four wire link 16, a heat rectifier 60 poled to pass the positive rectified signal, the heating relay CR1, a cooling rectifier 62 poled to pass the negative rectified signal, and the cooling relay CR2, receives the temperature control signal over the wire 22. The signal is decoded by oppositely poled rectifiers 60 and 62. If the decoded signal is positively rectified the heating relay CR1 is energized to close contacts 1C and to energize furnace 40. Mechanical heat switch 42 prevents the fan 36 from blowing the heating air into the living area until a minimum temperature is reached. If the decoded signal is negatively rectified the cooling relay CR2 is energized to close contacts 2C and to energize the air-conditioner 46. The connector wire 48 and the rectifier 50 ensure that the fan 36 is energized whenever the air-conditioner 46 is energized and that the air-condition 46 is not energized by the fan 36.

The fan/humidity signal decoder, including the wire 24 of the four wire link 16, a fan rectifier 64 poled to pass the negative rectified signal, the fan relay CR3, a humidifier rectifier 66 poled to pass the positive rectified signal, and a humidifier relay CR4, receives the fan/humidity control signal over the wire 24. The signal is decoded by the oppositely poled rectifiers 64 and 66. If the decoded signal is negatively rectified, fan relay CR3 is energized to close the fan contacts 3C and to turn on the fan 36. If the decoded signal is positively rectified, the humidifier relay CR4 is energized to close contacts 4C and turn on the humidifier 52. Normally closed contacts 3C' ensure that the humidifier relay contacts 4C control the fan 36 when the humidifier 52 is energized. The contacts 3C' open whenever the fan relay CR3 is energized so that the humidifier 52 is isolated whenever the fan 36 is energized for other purposes.

What has been described is a modification to HVAC systems for environmental control which include humidifiers to allow the humidifier to be controlled from the living area and to operate independently of the heating and cooling elements, without the necessity of rewiring the building structure in which the environmental control is occurring.

Although the present invention has been described and illustrated with respect to a preferred embodiment, various modifications are within the skill of those in this art without departing from the true spirit and scope of the invention.

What is claimed as new and desired to be secured by a Letters Patent of the United States is:

1. A heating, ventilating, air-conditioning and humidifying system comprising:
   a plant area containing a heating means, a cooling means and a fan means;
   a control unit remote from said plant area including first, second and third switches, two of said switches being thermostatically controlled for signaling demand for heat and cooling respectively and one of said switches being manually controlled for selecting fan operation;
   a connecting link consisting essentially of four wires extending from said control unit to said plant area;
   and the improvement characterized by:
   a humidifier means in said plant area;
   a fourth switch in said control unit remote from said plant area, said fourth switch being operable to signal demand for humidification;
   a source of positive DC voltage connected to a first of said four wires and a source of negative DC voltage connected to a second of said four wires;
   a first pair of said switches being connected between said first wire and the third and fourth of said four wires respectively;
   the second pair of said switches being connected between said second wire and the third and fourth of said four wires respectively;
   a first pair of oppositely poled unidirectional conducting devices connected between said third wire and a first two of said heating, cooling, fan and humidifier means; and
   a second pair of oppositely poled unidirectional conducting devices connected between said fourth wire and the other two of said heating, cooling, fan and humidifier means.

2. A heating, ventilating, air-conditioning and humidifying system as claimed in claim 1 wherein said fourth switch is humidistatically controlled.

3. A heating, ventilating, air-conditioning and humidifying system as claimed in claim 2 further comprising means for preventing simultaneous operation of either of said pairs of switches.

4. A heating, ventilating, air-conditioning and humidifying system as claimed in claim 1, said sources of DC voltage comprising a transformer and rectifier.

5. A heating, ventilating, air-conditioning and humidifying system as claimed in claim 4, said sources of DC voltage being located in said plant area.

6. A heating, ventilating, air-conditioning and humidifying system as claimed in claim 1, said oppositely poled unidirectional conducting devices comprising diode rectifiers located in said plant area.

7. A heating, ventilating, air-conditioning and humidifying system as claimed in claim 1, said heating means including a heating device and a heating relay controlling the energization of said heating device, said cooling means including a cooling device and a cooling relay controlling the energization of said cooling device, said fan means including a fan device and a fan relay controlling the energization of said fan device, and said humidifier means including a humidifier device and a humidifier relay controlling the energization of said humidifier device.

8. A heating, ventilating, air-conditioning and humidifying system comprising:
   a plant area containing a heating means, a cooling device and a fan device;
   a heating relay, a cooling relay and a fan relay for controlling the energization of said heating, cooling and fan devices respectively;
   a control unit remote from said plant area including a manually operated heat selection switch in series with a thermostatically controlled heat demand switch, a manually operated cool selection switch in series with a thermostatically controlled cool demand switch, and a manually operated fan selection switch;
   a connecting link consisting essentially of four wires extending from said control unit to said plant area;
   and the improvement characterized by:
   a humidifier device in said plant area;
   a humidifier relay for controlling the energization of said humidifier device;
   a manually operable humidifier selection switch in series with a humidistatically operated humidity demand switch in said control unit remote from said plant area;
   a transformer and a rectifier circuit in said plant area connected to the first and second wires of said connecting link for applying positive and negative DC voltages respectively to said first and second wires;
   said cool selection and demand switches being connected between one of the first and second wires and the third wire of said connecting link;

said fan selection switch being connected between said one of the first and second wires and the fourth wire of said connecting link;

said heat selection and demand switches being connected between the other of the first and second wires and the third wire of said connecting link;

said humidity selection and demand switches being connected between said other of the first and second wires and the fourth wire of said connecting link;

a first pair of oppositely poled rectifiers connected respectively between said third wire and said heating and cooling relays; and a second pair of oppositely poled rectifiers connected between said fourth wire and said fan and humidifier relays.

* * * * *